April 27, 1926.
H. M. STANFORD
STEEL TRAP
Filed April 27, 1925
1,582,797
2 Sheets-Sheet 2
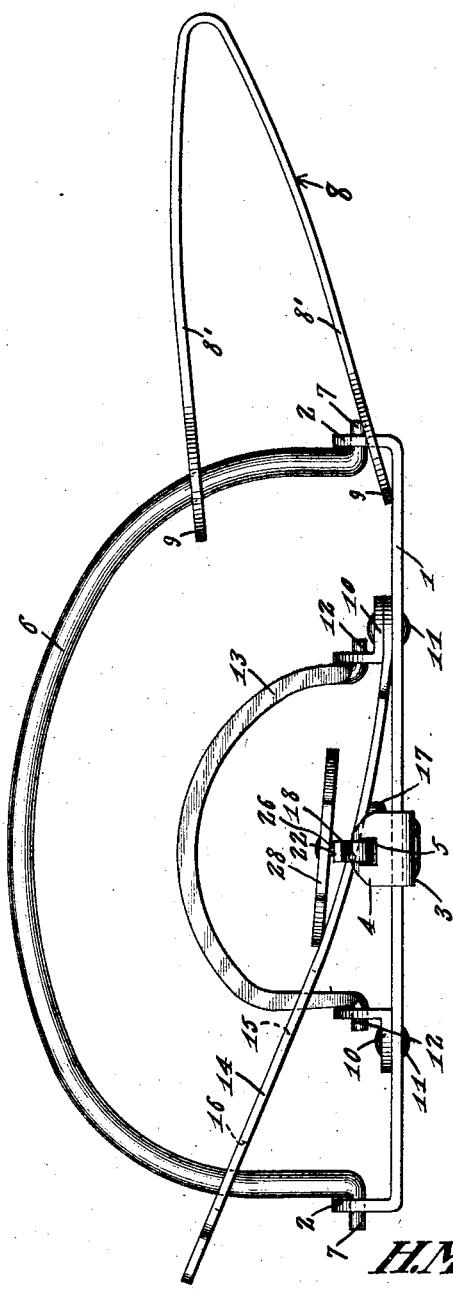
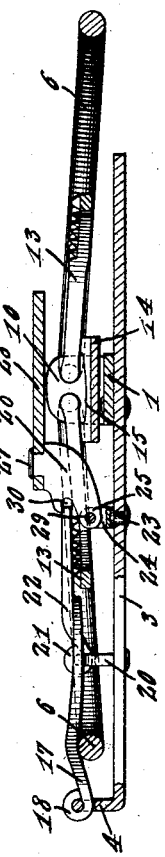
H. M. Stanford, INVENTOR.
BY
Geo. P. Kimmel, ATTORNEY.

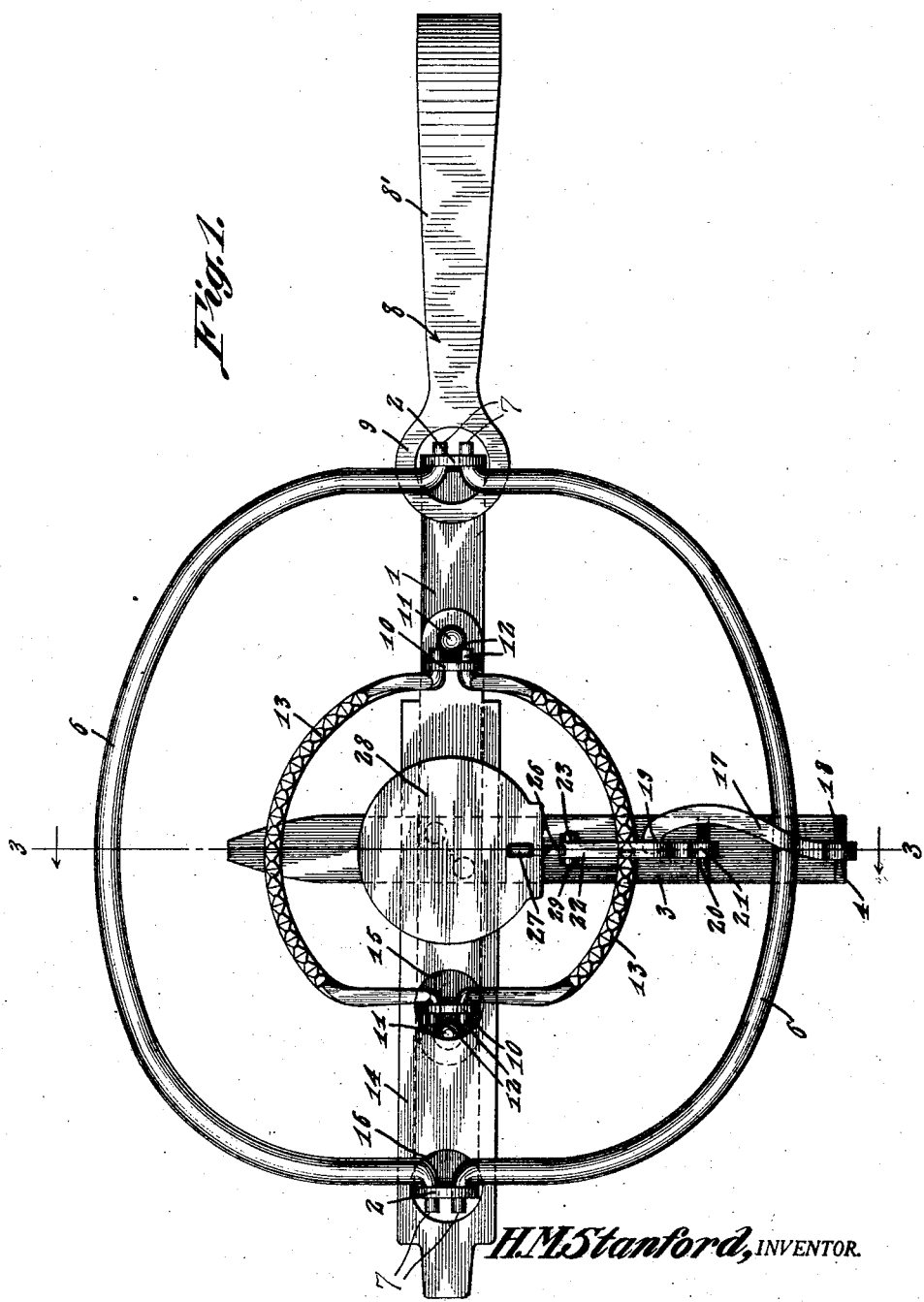

Patented Apr. 27, 1926.

1,582,797

UNITED STATES PATENT OFFICE.

HUGH M. STANFORD, OF HAYFIELD TOWNSHIP, CRAWFORD COUNTY, PENNSYLVANIA.

STEEL TRAP.

Application filed April 27, 1925. Serial No. 26,195.

*To all whom it may concern:*

Be it known that I, HUGH M. STANFORD, a citizen of the United States, residing at Hayfield Township, in the county of Crawford and State of Pennsylvania, have invented certain new and useful Improvements in Steel Traps, of which the following is a specification.

This invention relates to animal traps and pertains particularly to the class of steel traps.

The primary object of this invention is the provision, in a manner as hereinafter set forth, of a steel trap designed to catch and hold an animal's leg and at the same time grip the body of the animal in such a manner as to cause the quick death of the animal and at the same time prevent the animal from gnawing off its leg and escaping thus ruining the pelt and at the same time losing the animal to the trapper.

Another object of the invention is the provision, in a manner as hereinafter set forth, of a steel trap having two pairs of spring actuated jaws pivoted to swing toward and away from each other, one pair being smaller than the other and located within the larger pair.

Still another object of the invention is the provision, in a manner as hereinafter set forth, of a steel trap having two pairs of pivoted jaws and having interconnected securing latches for retaining the jaws in open set position in conjunction with a trigger mechanism stationed at the central part of the trap.

Still another object of the invention is the provision, in a manner as hereinafter set forth, of a steel trap having two pairs of pivoted jaws and having a spring actuating means common to both pairs of jaws and acting to simultaneously bring the same together.

The final object of this invention is the provision, in a manner as hereinafter set forth, of a steel trap of simple construction, light but strong and durable, and effective in preventing the escape of an animal after the same has once been caught thereby.

The invention will be best understood from a consideration of the following detailed description taken in connection with the accompanying drawings forming a part of this specification with the understanding however that the invention is not confined to any strict conformity with the showing of the drawings but may be changed and modified so long as such changes and modifications mark no material departure from the salient features of the invention as expressed in the appended claims.

In the drawings:—

Figure 1 is a top plan view of the trap embodying this invention, the same being shown as in open set position.

Figure 2 is a side elevation of the trap with the jaws closed.

Figure 3 is a transverse section taken upon the line 3—3 of Figure 1.

Referring now to the drawings in detail wherein like numerals of reference indicate corresponding parts throughout the several views, there is indicated by the numeral 1 an elongated relatively narrow flat band or body of metal having the ends upturned as at 2 and having secured transversely thereof midway between the ends the laterally extending latch carrying member 3, the outer end of which is upturned as at 4 and is further provided with an aperture 5. This structure constitutes the base of the trap embodying this invention.

Pivotally engaged side by side in the upturned ends 2 of the longitudinally extending portion of the base 1 is a pair of relatively large jaw members 6 having their ends 7 extending through the upturned portions 2 as shown. These jaw members as is clearly shown are adapted to swing toward each other under the urge of an expansible substantially V-shaped spring 8, the ends of the legs 8' of which terminate in the large rings 9 one of which surrounds one of the upturned ends 2 and is held beneath the pivoted ends of the jaws 6 and the other surrounds the jaws thus acting, when freed, to expand and force the jaws 6 to swing upwardly and close together.

Mounted upon the longitudinal portion 1 of the base, is a pair of angle brackets 10, one angle of each of which is riveted as at 11 to the base and the other angle of each is upturned and provided with a pair of apertures in the same manner as the upturned ends 2. Secured in the apertures of turned ends of the brackets 10 are the pivotal ends 12 of a pair of smaller jaw members 13 which are mounted, as shown, to swing toward each other within the larger jaw members 6.

Secured to the base 1 beneath one of the angle brackets 10, and by the securing rivet 11 of the angle brackets, is an elongated spring tongue 14 having a pair of apertures 15 and 16 therein, the jaws 13 passing through the aperture 15 of this tongue and the jaws 6 passing through the aperture 16 so that, when the tongue is allowed to spring upwardly as shown in Figure 2 it will cause the inner jaws 13 to swing toward each other to closed position and will also assist the spring 8 in causing the jaws 6 to swing to closing position. The jaws 6 and 13 will therefore be simultaneously closed and the jaws 6 will be doubly strong due to the pair of springs controlling the same.

The upturned end 4 of the transverse portion 3 of the trap base has engaged through the aperture 5 formed therein an outer latch member 17, the outer end of the latch member being pivoted as at 18 to engage over the top of the portion 4 and the inner end, or free end of the latch member is curved as shown and the terminal end thereof is turned at right angle to the length of the latch as indicated at 19.

Secured to the portion 3 of the base at approximately the central portion thereof is an upstanding apertured stud 20 and in the aperture of this stud there is secured the looped end 21 of an inner latch member 22.

Secured to the portion 3 of the base at a point adjacent to the portion 1 of the base is an upstanding stud 23 having the upper end thereof bifurcated as at 24 and between the furcations of this stud there is positioned the extended lower portion 25 of a trigger member 26 which member has its upper portion 27 extended through and secured to a bait pan 28, adjacent the edge of the pan. This pan as shown is located at the central part of the trap in the center of the inner jaws 13. A pivot pin 29 secures the portion 25 of the trigger between the furcations of the stud 23, and this trigger member has its outer edge notched as at 30 for the engagement therewith of the inner latch 22 for the purpose to be now described.

When the trap embodying this invention is set, the springs 8 and 14 are depressed and the jaws 6 and 13 are swung apart and spread open as shown in Figure 1. The outer latch member 17 is then swung across one of the jaws 6 to overlie the same and the right angled portion 19 is located beneath the inner latch member 22 which in turn is swung downwardly across one of the jaw members 13 and the free end of this inner latch member is then engaged in the notch 30 of the trigger 26, all of which is shown in Figure 3. The upward pressure of the spring pressed jaws 6 and 13 will then cause the latches 17 and 22 to securely engage one another and will also cause the inner latch 22 to retain engagement in the notch 30 of the trigger 26 carried by the pan 28. It will be readily apparent that when an animal steps upon the pan 28, the depression of the pan which will be caused, will cause the release of the inner latch 22 and when that is released the outer latch 17 will also be released thus allowing the springs 8 and 14 to cause the jaws to be swung upwardly and toward each other to close the same upon the animal and hold the same a captive.

From the foregoing description it will be readily seen that there has been provided a new and novel steel trap structure having a novel latch means for the pair of jaws provided and also having a novel spring construction for the positive closing of the jaws.

Having thus described my invention what I claim is:—

1. In a trap of the character set forth, a base, nested pairs of spring actuated jaws pivoted upon said base to swing toward and away from each other, a trigger member, and interengaging latches carried by said base and engaging said trigger to hold said jaws in open set position.

2. In a trap of the character set forth, a base, two pairs of nested jaws pivoted to said base to swing toward and away from each other, spring actuating means for and common to both pairs of jaws, a trigger member, and a pair of latches adapted to overlie and hold said jaws open, one of said latches engaging said trigger and the other engaging under the first mentioned latch.

3. In a trap of the character set forth, a base, two pairs of jaw members pivoted to said base to swing toward or away from each other, actuating means for said jaws, a trigger member carried upon said base, a pair of latches pivoted to the base to overlie said jaws when open, one latch engaging said trigger and the other engaging under the first mentioned latch.

4. In a trap of the character set forth, a base comprising an elongated member and a transverse member secured to the central part thereof, a plurality of pairs of jaw members carried upon said base, a trigger, jaw securing latches connectible to and releasable by said trigger, and a relatively long spring tongue secured to said base and having a pair of apertures therein through each of which apertures a pair of jaws extend.

5. In a trap of the character set forth, a base comprising an elongated member and a transverse member secured to the central part thereof, the outer end of said transverse member being upturned, a plurality of pairs of jaws carried upon said base, a trigger member, a latch pivotally secured at one end to said upturned member to overlie one jaw of one of said pairs, and having its free end turned inwardly, a supporting stud upon said transverse member, an inner latch pivoted thereto and adapted to overlie one jaw of the other pair and engage said trigger, said first mentioned latch having its inturned end engageable under the inner latch, and spring actuating means normally controlling said jaws.

In testimony whereof, I affix my signature hereto.

HUGH M. STANFORD.